April 20, 1937.   W. ENGS ET AL   2,077,382
PROCESS FOR HALOGENATION OF ORGANIC COMPOUNDS
Filed Oct. 7, 1935
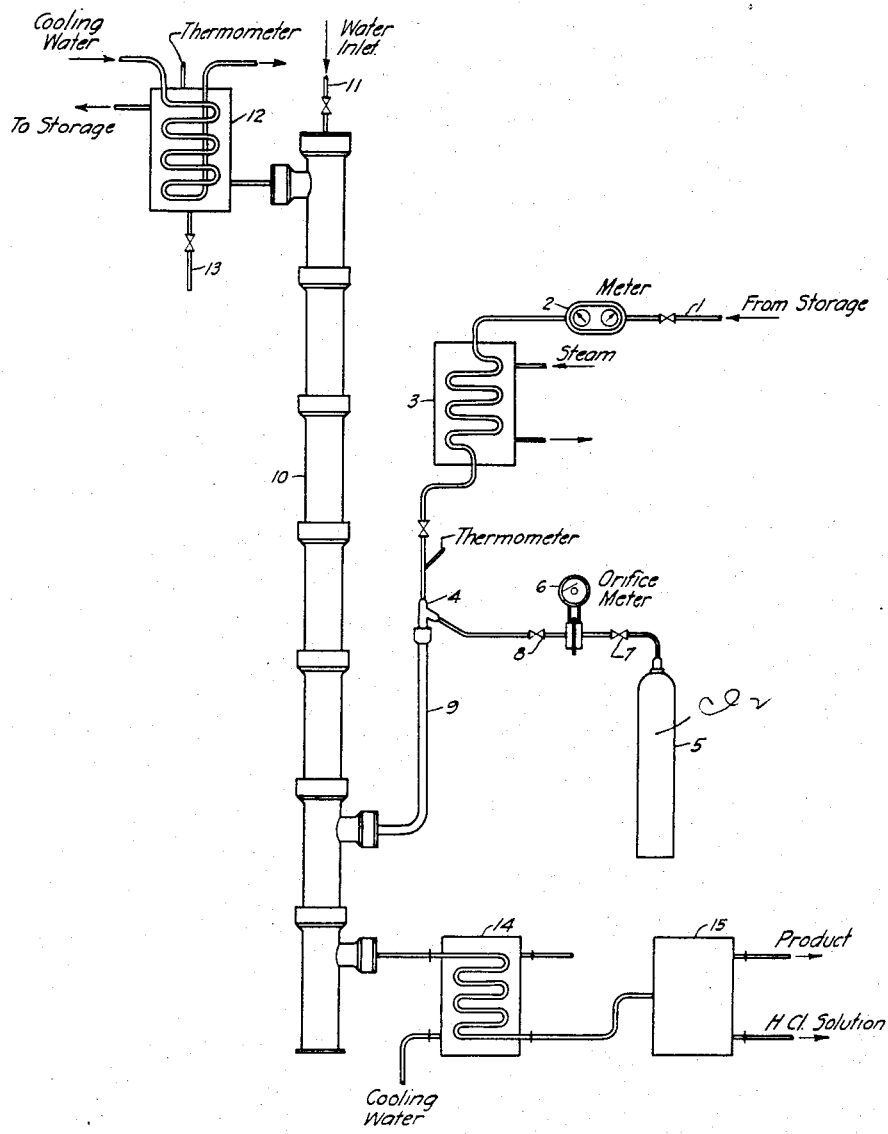
Inventors:
William Engs
Arthur Redmond
By their Attorney Arthur B Bakelar Patented Apr. 20, 1937

2,077,382

UNITED STATES PATENT OFFICE 2,077,382

PROCESS FOR HALOGENATION OF ORGANIC COMPOUNDS

William Engs and Arthur Redmond, Berkeley, Calif., assignors to Shell Development Company, San Francisco, Calif., a corporation of Delaware Application October 7, 1935, Serial No. 43,947

20 Claims. (Cl. 260—166)

This invention is concerned with an improved process for carrying out, on an industrially practical scale, the halogenation of organic compounds via substitution. It provides a novel method of great flexibility and ease of control whereby the undesirable side reactions usually accompanying such halo-substitutions, especially reactions between the hydrogen halide formed and the desired product and/or any unsubstituted starting material present, may be substantially entirely eliminated, or very greatly reduced in extent, thereby improving the yields of the desired end-products.

The halogens may react with most organic compounds, especially unsaturated organic compounds, in a number of different ways. Even when the conditions of reaction are adjusted so that one type of reaction, for example, substitution, is substantially favored over halogen addition or other types of reaction, it is still difficult to obtain high yields of individual products because of the formation of higher substitution products unless the organic compound used as starting material is present in substantial excess of the stoichiometric requirement for reaction with the halogen. In spite of this precaution the yield of desired product, based on the organic compound consumed, may still be commercially impractical due to reaction between the excess starting material and the halogen acid formed in the substitution reaction. A further source of loss in yield may result from reaction of the desired halogen substituted product with the halogen acid simultaneously produced.

We have found that these losses may be best avoided by prompt removal of the halogen acid substantially as fast as it is formed by treatment of the reaction mixture with a suitable halogen acid solvent, preferably a solvent which is substantially immiscible with the organic compound being treated and most preferably also substantially immiscible with the desired halogen substituted product. To this end we have found it usually most advantageous to pass the organic compound under treatment and halogen or a compound yielding halogen under the reaction conditions thru a reaction zone, maintained at a temperature favoring halogen substitution, directly into contact with the halogen acid solvent, preferably in the form of a spray or the like, whereby the halogen acid is separated from any unsubstituted starting material present and then remove the halogen acid containing solvent from further contact with the halogen substituted organic compound. In this way the solvent not only serves to absorb the liberated halogen acid and prevent its reaction with the desired end-product or with any unhalogenated starting material present, but also effects a prompt and sudden cooling of the reaction mixture which prevents other undesirable side reactions such, for example, as further halogenation of the product by any unreacted halogen which may be present. Applied in this preferred manner the solvent introduced may also serve to condense the product where the reaction is carried out in the vapor phase. Our novel process has the further advantage of making the recovery of by-product free halogen acid a very simple procedure.

While our improved method may be applied to all organic compounds capable of halogenation by substitution such as hydrocarbons, ketones, aldehydes, esters, organic acids, and the like, whether aliphatic, aromatic, carbocyclic or heterocyclic, it has particular advantage in the production of halo-substituted unsaturated compounds where difficulties due to side-reactions, particularly halogen acid addition reactions, are especially acute. Therefore, for the purpose of making our invention more clear it will be described with more specific reference to the manufacture of such products, particularly chlorinated unsaturated compounds.

Suitable starting material which may be used for the manufacture of unsaturated halogen containing compounds in high yields by our improved method include unsaturated alkyl, aralkyl, and alicyclic compounds containing one or more olefinic linkages and embracing besides the unsaturated hydrocarbons, their substitution and addition products which contain at least one double bond. The following list shows some of the types of compounds to which our process can be applied with particular advantage:

$CH_2=CH_2$, $CH_2=CH-CH_3$, $CH_2=CCl-CH_3$, $CH_3-CH=CH-CH_3$,
$CH_2=CH-CH_2-CH_3$, $CH_3-CH=CH-CH_2Cl$, $CH_3-CH=CH-CHBr_2$,
$CH_3-CCl=CH-CH_2Cl$, $CH_3-\underset{CH_3}{\overset{CH_3}{C}}=CH_2$, $CH_2=CH-\underset{CH_3}{\overset{CH_3}{CH}}-CH_3$
$CH_3-CH=\underset{CH_3}{\overset{CH_3}{C}}-CH_3$, $CH_2=CH-\underset{CH_3}{\overset{CH_3}{C}}-CH_3$, $CH_3-CH=CH-CH_2-CH_2-CH-CH_3$, $CH_3\underset{\diagdown CH_2-CH_2\diagup}{\overset{\diagup CH=CH\diagdown}{}}CH_2$, $CH_2=CH-CH_2-CH_2-CH=CH_2$, ⬡—$CH_2-CH=CH_2$, ⬡—$CH_2-CH=CH-CH_3$, etc.

Such compounds may be used in a pure state, either as individual unsaturated compounds or as mixtures of the pure compounds, or in admixture with paraffins or other saturated materials which may or may not undergo simultaneous reaction. The source of the unsaturated compound or unsaturated compound containing mixture used is immaterial. When working with olefines, for example, they may be derived from mineral oils as petroleum, petroleum products, shale oil, and the like, or from natural gas, or coal, peat, pitches and like or related carboniferous natural material, as well as from animal and vegetable oils, fats and waxes. The olefines present in such starting material may be of natural occurrence, the result of pyrolytic treatment or cracking, or a product of a destructive hydrogenation treatment. Furthermore, such olefines may advantageously be used in the form of hydrocarbon fractions consisting of, or predominating in, hydrocarbons containing the same number of carbon atoms to the molecule, as a propane-propylene cut, a butane-butylene cut, a pentane-pentylene cut, etc. Alternatively the olefine or olefines used as starting material may be obtained by the dehydration of alcohols.

The conditions of halogenation are preferably adjusted to the nature of the unsaturated compound or compounds undergoing treatment and the halogenation agent employed, so that the desired degree of halogen substitution is promoted while halogen addition is suppressed. With those unsaturated compounds wherein a double bond joins two carbon atoms one of which is linked to three carbon atoms, such as tertiary-base olefines, e. g., isobutylene, tri-methylethylene, unsymmetrical methyl ethyl ethylene, tertiary hexylenes, and the like, halogen substitution takes place in preference to addition even at quite low temperatures in the absence of an excess of halogen. With open or closed chain compounds of an aliphatic character possessing other types of double linkages, such, for example, as ethylene, the secondary base olefines as propylene, α and β butylene, α and β amylene, etc., cyclohexene, and the like, temperatures of halogenation above 100° C. especially between about 200° C. and 500° C., are necessary in order to promote substitution rather than addition. In such cases in general the higher the temperature the more unsaturated halide is formed, while the addition of halogen to the double bond or bonds is suppressed, but in any case the reaction temperature is preferably maintained below those temperatures at which polymerization and/or cracking of the unsaturated compounds are favored under the prevailing space velocities, pressures and degree of dilution.

In view of the high reaction velocity of free halogen with unsaturated compounds, even at low temperatures, it is preferable to preheat the reactants separately if reaction temperatures are desired which are higher than would be obtained by the heat of the reaction proper. Heating of the reaction zone alone is not very effective because if the cold reagents enter the reaction zone they will have at least partly reacted via addition of halogen and/or halogen acid before they are heated to the desired temperature at which substitution is favored. In carrying out our invention, we preferably heat the unsaturated organic compound to the desired reaction temperature and then introduce the free halogen, when such is employed. It is usually desirable to make use of high velocity and of turbulent flow to prevent the occurrence of flame and its concomitant production of free carbon, and to make higher working temperatures usable. The high velocity of flow of reaction mixture enables the reactants to enter at a speed in excess of the speed of flame propagation and the turbulent flow produces an intimate mixing which enables the reactants to become uniformly dispersed in each other before any considerable amount of halogenation takes place.

While, in most cases, we prefer to have the molal ratio of available halogen to unsaturated compound not exceed 1 to 1 so that we obtain a preponderance of monohalogen substitution product, we may employ a higher ratio and obtain a higher degree of halogen substitution, such as a di- or tri- chloride which will still be unsaturated, by proper control of the reaction temperature. More preferably, however, we operate with an excess of unsaturated compound over the stoichiometric requirement for reaction with the available halogen. For the preparation of mono-chlorinated olefins about 1.25 to about 1.75, preferably about 1.50, mols of olefine per mol. of free chlorine gives efficient results. The chlorine may be introduced at high velocity at a plurality of separated points along the reaction tube while the material being halogenated is maintained within the desired range of reaction temperature. This is a particularly useful method for the preparation of unsaturated products of higher halogen content than the monosubstituted form since the ratio of free halogen to unsaturated compound may be maintained substantially at the optimum at all times, and yet any desired degree of halogenation may be effected with safety in a single operation.

Any of the known halogenation catalysts, such as halides of iron, antimony, tin, phosphorous, aluminum, etc., or metallic iron, or sulfur or active carbon or the like may be used to accelerate the halogen substitution. The reaction may also be accelerated photochemically by the use of reaction tubes of silica or glass which permit the passage of light of effective wave lengths and exposure to sunlight or ultra-violet or other rays from suitable light-giving devices. If desired, a plurality of reaction accelerating expedients may be used, such as heat and light, or heat and catalyst, or heat, light and catalyst. In general, the temperature of the reaction may be lowered if a catalyst or effective light is used to accelerate the reaction.

Inert diluents, such as nitrogen, etc., may be added with the reactants and utilized for their capacity to absorb heat. Overheating may be prevented by conventional cooling means or by the evaporation of an internal cooling agent, which may be an excess of the organic compound being treated for example, and/or a lower boiling hydrocarbon or the like, so that there is instantaneous dissipation of the reaction heat uniformly thruout the reaction mixture. Oxygen may be added as an inhibitor of the substitution reaction of saturated organic compounds, as paraffin hydrocarbons, where such are present with the unsaturated organic compound being treated.

The reaction may be carried out with the organic compound in either the liquid or gaseous state. Either intermittent, batch or continuous methods of operation may be employed and unreacted starting material may be advantageously recycled to the reactor to increase conversions.

However the halogen substitution reaction is carried out, it is only essential to our invention that the minimum contact time for the desired degree of reaction be provided and that subsequent reaction be promptly inhibited by treatment of the reaction products with a solvent for the halogen acid formed. Prior attempts to accomplish the same end by sudden cooling of the reaction mixture have been unsuccessful because of the high reactivity of the halogen acids, especially with unsaturated organic compounds, even at low temperatures. Processes involving separation of the halogen acid from the reacted mixture by fractionation lead to even more extensive secondary reaction and we have found that only by replacement of fractionation by a "quenching" of the secondary reactions by scrubbing out the halogen acid with a suitable solvent, may commercially economical yields of the desired end product be attained.

While any suitable halogen acid solvent may be applied in our process, we have found that one of the most effective is water not only because of its high solubility for the halogen acids and substantial immiscibility with most halogenated organic products but also because of its high heat capacity and latent heat which make it an effective cooling agent when used in small amounts so that undue dilution of the hydrochloric acid may be avoided. Other suitable media for effecting the prompt removal of halogen acid from the reaction mixture include aqueous salt solutions such as brine and the like, or aqueous alkaline solutions or dilute solutions of acid unreactive with the organic compound being treated and the desired halogen substituted product. Still other suitable solvents may be used.

The method of applying the chosen halogen acid solvent may vary widely depending upon the method of carrying out the halogen substitution and on the nature of the organic compound being halogenated and of the desired end-product. Thus where high boiling compounds are being treated batch-wise in the liquid phase it may sometimes be feasible to introduce the halogen acid solvent directly into the reaction mixture with stirring, for example, to promote intimate contact of the phases and then promptly remove the resulting acid solution during the reaction. In continuous methods of operation on the other hand, it is usually more advantageous to provide a separate solvent treating zone in direct communication with the halogenation zone to which the reactants may be passed as rapidly as reacted and in which they may be intimately contacted with the halogen acid solvent so that the acid may be promptly withdrawn from reaction. To this end resort may be had to spray treatment, or counter current scrubbing of the reacted mixture, in empty or preferably suitably packed towers, or other conventional methods of promptly extracting the halogen acid.

The amount of halogen acid solvent which will be required in any given case will be influenced by the method of operation, the degree of cooling of the reaction product which it is desired to impart thereby, etc. In general, it is inadvisable to use such small amounts of solvent, or to recirculate solvent containing free acid to such an extent that the acid solvent solution becomes substantially reactive with the desired product and/or any unreacted starting material present. In the chlorination of unsaturated olefines, for example, it has been found that aqueous hydrochloric acid solutions of around 20% or more are undesirable as they tend to cause the formation of excessive amounts of saturated dichlorides even at ordinary temperatures.

As one example of a method of applying our invention, reference may be had to the accompanying drawing which shows diagrammatically a preferred assemblage of apparatus adapted to the manufacture of methyl allyl chloride.

Isobutylene, or a mixture containing isobutylene, for example, a butanebutylene fraction from cracked petroleum oil, in either the liquid or gaseous state, the liquid state being preferred as it gives somewhat higher yields, is fed from a storage vessel, not shown, thru valve controlled pipe line 1 and metering device 2, to a preheater 3 (which may be omitted when it is desired to add the isobutylene in the liquid phase) and thence to a branched tube 4 where it comes into contact with a stream of chlorine from cylinder 5. The flow of chlorine is measured by orifice meter 6 and controlled by valves 7 and 8 preferably so that about 2/3 of a mol. of chlorine are introduced per mol. of isobutylene. Higher chlorine ratios may be used altho they are less desirable as they tend to favor formation of dichlorisobutane and dichlorisobutene, while molal chlorine-isobutylene ratios lower than about 2/3:1 are without appreciable effect except in so far as they reduce the capacity of the apparatus. The chlorine and isobutylene streams are advantageously brought together at an angle of about 135° to promote rapid mixing, the chlorine being usually admitted as the side stream.

The mixed reactants pass thru a reaction tube 9 which may suitably be made of Pyrex glass or other acid and heat resistant material, and which preferably is of such a volume that the average time of residence of the reactants therein is about 1 second. Contact times of the reactants in the reaction zone of less than 1 second have been found to be sufficient for completion of the reaction to form methyl allyl chloride but there appears to be no measurable advantage in reducing the time below that value. Somewhat longer reaction times may be permissible in certain cases altho they tend to lower the yield of methyl allyl chloride, particularly if times of 5 seconds or over are used increasing amounts of higher chlorinated products are formed. On substantial completion of the reaction in tube 9, the reactants are conducted at once to the bottom of a hydrochloric acid scrubbing tower 10 which may advantageously be made of tile pipe packed with ceramic rings or other suitable filling which will promote intimate contact of the water, admitted at 11, with the reaction mixure. The water, or equivalent HCl solvent, is admitted preferably at such a rate as will form about a 5 to 10% HCl solution at the bottom of the column. The scrubbing water not only absorbs the liberated hydrochloric acid promptly stopping substantially all reaction thereof with the excess isobutylene present, but also condenses the methyl allyl chloride produced.

The unreacted isobutylene, together with butane and α and β butylene if a butane-butylene fraction has been used as starting material, passes to the top of tower 10 from which it is run to a cooler 12, where it is cooled as low as possible to avoid losses of methyl allyl chloride which has a high vapor pressure. The methyl allyl chloride so recovered may be withdrawn thru valve controlled drain 13 and added to the product. The aqueous hydrochloric acid and methyl allyl chloride condensed in tower 10 may be run from the bottom thru an auxiliary cooler 14 to a separator 15 where the mixture is allowed to stratify and the two layers are withdrawn separately. The hydrochloric acid layer may be concentrated in the usual way to give a valuable by-product, while the methyl allyl chloride layer is run to a refining still, not shown, in which the separation of a substantially pure product is a very simple operation due to the absence of tertiary butyl chloride.

A typical sample of product has the following properties:

| | |
|---|---|
| Total chlorine | 39.2% |
| Saponifiable chlorine | 37.3% |
| Specific gravity 20/4 | 0.924 |
| Bromine number | 175.4 |
| A. S. T. M. distillation | |
| I. B. P | 70.2° C. |
| 5% | 71.2° C. |
| 10% | 71.5° C. |
| 50% | 72.0° C. |
| 90% | 72.3° C. |
| 95% | 72.5° C. |

The yields obtainable under various conditions of operation are shown in the following table:

| Chlorine feed rate pounds of $Cl_2$ per hour | Molal ratio isobutylene to chlorine | Isobutylene inlet temperature °C. | Reaction time seconds | Weight percent methyl allyl chloride in the crude product | Free HCl content of water from scrubber percent | Yield Percent based on chlorine | Yield Percent based on isobutylene |
|---|---|---|---|---|---|---|---|
| 10 | 1.39 | 132–143 | 14.4 | 75.0 | 4.64 | 72 | 71 |
| 16 | 1.74 | 143–147 | 2.1 | 77.5 | 3.48 | 77 | 77 |
| 16 | 1.93 | 97–104 | 2.0 | 78.2 | 3.11 | 78 | 78 |
| 16 | 1.86 | about 0 | 2.0 | 78.8 | 3.14 | 85 | 83.5 |
| 30.8 | 1.68 | about 0 | 1.2 | 81.0 | 3.81 | 89.0 | 89.0 |

By a similar procedure carried out at higher temperatures, preferably by preheating the olefine to about 200 to 500° C. before its admixture with the chlorine, high yields of monohalogenated unsaturated compounds may be obtained from propylene, 2-butene, and homologous secondary base olefines.

While the olefines and their partially halogenated derivatives have been emphasized in describing our invention and some of the typical methods of carrying it out, it will be obvious that our process may be applied with equal advantage to the halo-substitution of a wide variety of other unsaturated compounds of which allyl acetate, mesityl oxide, oleic acid, and the like are typical. Nor is our invention limited to the halogenation of unsaturated compounds since by obvious modification of operating conditions it may also be applied to the halo-substitution of other organic compounds capable of reacting, under the usual halogenation conditions, with the halogen acid formed. Thus, for example, our invention may also be advantageously applied in the chlorination of paraffin hydrocarbons, particularly paraffin wax where the prolonged contact with HCl occurring in the usual methods causes extensive discoloration of the product.

It is thus evident that our process offers great advantage in the technical scale production of many different halogenated products. By providing for the prompt separation of reaction products which in prior procedures have been allowed opportunity to react during cooling and/or fractionation treatments, important savings both in halogen and organic starting material are realized. The saving in organic unsaturated compounds, particularly when such are used in a purified state, are often of greater economic significance than the savings in halogen, isobutylene in a concentrated form being more costly than chlorine, for example. Our process is not only controlled with great ease to give high yields of individual products but also may be carried out in simple, easily constructed apparatus.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims, in which it is our intention to claim all novelty inherent therein as broadly as is possible in view of the prior art.

We claim as our invention:

1. In a process of halogenating, by substitution, an organic compound capable of reacting with the halogen acid formed and containing a plurality of carbon atoms, the steps of contacting the reaction products substantially as fast as formed with a substantially non-reactive solvent for the halogen acid produced and separating the halogenated organic product from the resulting halogen acid solution whereby prolonged contact of halogen acid solution with other components of the reaction mixture is avoided.

2. In a process of halogenating by substitution an unsaturated organic compound containing an olefinic linkage, the steps of contacting the reaction products substantially as fast as formed with a solvent for the halogen acid produced and separating the resulting halogen acid solution from the other components of the reaction mixture whereby prolonged contact of halogen acid solution with other components of the reaction mixture is avoided.

3. In a process of halogenating by substitution, an unsaturated organic compound containing an olefinic linkage, the steps of removing the halogen acid formed from the substantially reacted mixture immediately upon issuance of said mixture from the reaction zone by extraction with a solvent for said acid which is substantially immiscible with the unsaturated organic compound, and recovering an unsaturated organic halide.

4. In a process of halogenating by substitution an unsaturated organic compound containing at least one unsaturated structure of the class consisting of alkene, cycloalkene and aralkene structures, the steps of treating the reacted mixture substantially as soon as formed with a solvent for the halogen acid formed added in such an amount as will form a halogen acid solution of low reactivity with the unsaturated product.

5. In a process of halogenating by substitution an unsaturated organic compound containing at least one olefinic linkage, the steps of removing the reaction products from said chamber substantially as fast as formed and immediately cooling the withdrawn mixture by direct contact with an aqueous solvent for the halogen acid formed of an acid concentration such as is not substantially reactive with the unsaturated organic halide produced at the temperature to which the mixture is cooled.

6. In a process for the substantial monohalogen substitution of an unsaturated organic compound containing an olefinic linkage, the step of contacting the halogen acid produced substantially as fast as formed with a solvent therefor which has a low solubility for the other components of the reaction mixture and recovering an unsaturated organic halide.

7. In a process for producing a chloro substituted olefine from the corresponding olefine, the steps of removing the primary products rapidly from the sphere of the reagent, substantially simultaneously separating the hydrochloric acid formed from reactive contact with the other components of the removed mixture by absorption in a solvent therefor, and recovering an unsaturated organic chloride.

8. In a process of chlorinating by substitution an unsaturated organic compound containing an olefinic linkage, the step of reducing the concentration of the hydrochloric acid formed in the reaction by addition of water to the reaction products substantially as fast as formed in such an amount that said acid no longer has power to substantially add under prevailing conditions to the double bond of the unsaturated organic chloride produced.

9. In a process of chlorinating by substitution an unsaturated organic compound containing an olefinic linkage the step of contacting the products of said reaction substantially as fast as formed with an aqueous solvent for the hydrochloric acid produced therein which is substantially unreactive at the temperature of absorption with the unsaturated organic chloride also produced.

10. In a process of chlorinating by substitution an unsaturated organic compound containing an olefinic linkage the step of passing the products of said reaction substantially as fast as formed into a hydrochloric acid absorption system wherein reaction between the hydrochloric acid and the unsaturated product is substantially suppressed.

11. In a process of chlorinating by substitution an unsaturated organic compound containing an olefinic linkage the step of substantially dissipating the heat liberated from the chlorination by treatment of the reaction products substantially as soon as they are formed with a sufficient quantity of solvent for the hydrochloric acid produced to form a hydrochloric acid solution substantially unreactive at the temperature to which the reaction products are cooled with the unsaturated organic chloride product.

12. In a process of chlorinating by substitution an unsaturated organic compound containing an olefinic linkage the step of rendering the hydrochloric acid formed in the reaction substantially non-reactive with the other components of the reaction mixture, by scrubbing out said acid substantially as fast as it is formed with a spray of water.

13. In a process of chlorinating by substitution an olefine, the step of absorbing the hydrochloric acid produced substantially as fast as formed in a spray of water and recovering unsaturated organic chloride.

14. A process of chlorinating by substitution a secondary olefine which comprises preheating said olefine to a temperature above one hundred degrees centigrade but below that temperature at which substantial degradation of the olefine takes place under the reaction conditions, admixing gaseous chlorine with the preheated olefine, absorbing the hydrochloric acid produced in the resulting reaction substantially as fast as formed by means of a spray of water and recovering unsaturated organic chloride.

15. A process of chlorinating by substitution a secondary butylene which comprises preheating the secondary butylene to about 200 to 500° C., injecting gaseous chlorine into the preheated butylene at a velocity in excess of that of flame propagation under the existing conditions, absorbing the hydrochloric acid produced substantially as fast as formed by means of a spray of water and recovering unsaturated butylene chloride.

16. In a process of chlorinating by substitution a tertiary olefine, the step of separating the hydrochloric acid formed from the other components of the reaction mixture by absorption in water substantially as fast as formed and recovering tertiary unsaturated organic chloride.

17. In a process of chlorinating isobutylene by substitution, the step of separating the hydrochloric acid formed from the other components of the reaction mixture by absorption in water substantially as fast as formed and recovering methyl allyl chloride.

18. A process of producing methyl allyl chloride which comprises injecting chlorine into a molal excess of isobutylene, contacting the reaction mixture within about 5 seconds with sufficient water to form a solution with the hydrochloric acid produced of a hydrochloric acid concentration of less than 20%, and recovering methyl allyl chloride.

19. A process of producing methyl allyl chloride which comprises injecting a stream of gaseous chlorine into a stream of liquid isobutylene containing hydrocarbon, passing the reaction mixture substantially on substantial completion of the chlorine substitution reaction into a hydrochloric acid scrubbing tower fed with sufficient water to substantially condense the methyl allyl chloride formed and recovering from said tower aqueous hydrochloric acid and methyl allyl chloride.

20. In a process of chlorinating a tertiary amylene by substitution, the step of separating the hydrochloric acid formed from the other components of the reaction mixture by absorption in water substantially as fast as formed and recovering an unsaturated organic chloride.

WILLIAM ENGS.
ARTHUR REDMOND.